United States Patent [19]

Correia et al.

[11] 3,886,222

[45] May 27, 1975

[54] PROCESS FOR OBTAINING 1,1,1,2-TETRACHLOROETHANE

[75] Inventors: Yves Correia; Jean-Claude Strini, both of Saint-Auban, France

[73] Assignee: Rhone-Progil, Courbevoie, France

[22] Filed: Mar. 17, 1972

[21] Appl. No.: 235,777

Related U.S. Application Data

[63] Continuation of Ser. No. 786,740, Dec. 24, 1968, abandoned.

[30] Foreign Application Priority Data

Dec. 29, 1967 France .............................. 134294/67

[52] U.S. Cl. ............................................. 260/658 R
[51] Int. Cl. ............................................. C07c 17/04
[58] Field of Search ............................... 260/658 R

[56] References Cited
UNITED STATES PATENTS

| | | | |
|---|---|---|---|
| 2,097,442 | 11/1937 | Cass | 260/658 R |
| 2,448,739 | 9/1948 | Ross | 260/658 R |
| 3,338,982 | 8/1967 | Leach et al. | 260/660 |
| 3,637,875 | 1/1972 | Correia et al. | 260/658 R |

FOREIGN PATENTS OR APPLICATIONS

| | | | |
|---|---|---|---|
| 530,649 | 7/1931 | Germany | 260/658 R |
| 606,331 | 10/1960 | Canada | 260/660 |

OTHER PUBLICATIONS

Poutsma et al., JACS, 86, pp. 3,807–3,814 (1964).

*Primary Examiner*—Delbert E. Gantz
*Assistant Examiner*—Joseph A. Boska

[57] ABSTRACT

The process for producing 1,1,1,2-tetrachloroethane by chlorination of 1,1-dichloroethylene in the absence of light.

3 Claims, No Drawings

PROCESS FOR OBTAINING 1,1,1,2-TETRACHLOROETHANE

This is a continuation of application Ser. No. 786,740 filed Dec. 24, 1968, now abandoned.

This invention relates to a process for the preparation of 1,1,1,2-tetrachloroethane by chlorination of 1,1-dichloroethylene.

It is well known that chlorination of 1,1-dichloroethylene, in the presence of light, yields 1,1,1,2-tetrachloroethane in yields as high as 90–95% of theoretical. According to the publication of M. L. Poutsma and R. L. Hinman, Journal of American Chemical Society, Vol. 86, page 3807 (1964), it is also known that in the absence of light and at a temperature of 25° C, 1,1-dichloroethylene remains stable over a long period of time and that it does not react with chlorine.

This invention is based upon the unexpected discovery that chlorination of 1,1-dichloroethylene to form 1,1,1,2-tetrachloroethane can be carried out in the absence of light.

It is an object of this invention to produce and to provide a method for producing 1,1,1,2-tetrachloroethane by chlorination of 1,1-dichloroethylene in the absence of light.

In accordance with the practice of this invention, 1,1-dichloroethylene is reacted in the liquid phase with molecular chlorine in a reaction zone, in the absence of catalyst and light and at a temperature within the range of 20° to 90° C and preferably within the range of 50° to 70° C.

By the term "absence of catalyst," it is meant that if traces of aluminum, iron, copper, titanium, antimony, sulphur and/or phosphorus are present, as in the form of their chlorides, either as impurities or as a result of corrosion of the production equipment, such traces should be present in very small proportions below 0.004% by weight, expressed in the form of chlorides, based on the liquid reaction phase, and preferably below 0.0025% by weight.

The dichloroethylene is employed in the liquid phase in accordance with the practice of this invention and is reacted in solution in one or more halogenated solvents, such as hexachlorobutadiene, and preferably 1,1,1,2-tetrachloroethane. It is beneficial to make use as the solvent medium of chlorinated compounds prepared by the process of this invention. The dichloroethylene can be diluted or not by the solvent before being introduced into the reaction medium.

The molecular chlorine employed in the practice of this invention can be in the form of liquid chlorine, which is gasified before entering into the reaction, or in the form of chlorine gas, such as collected at the exit of chlorine production plants.

It has been found that the yield of 1,1,1,2-tetrachloroethane is relatively insensitive to the purity of the chlorine whether use is made of 99.9% pure liquid chlorine or 95% pure chlorine gas, in which the main impurities may be $CO_2$, $O_2$, $N_2$ and CO.

Chlorine can be diluted by gases which do not react under the reaction conditions, such for example as the gases identified above as impurities. Chlorine diluted by inert gases in a molar ratio up to 1/1 is not detrimental to the reaction but generally it is disadvantageous to make use of excessive amounts of inert gas because of the added cost of handling such larger volumes of gases and because of its detrimental effect on productivity.

The molar ratio of chlorine/1,1-dichloroethylene should be equal to or less than 0.95 and, in order to achieve maximum productivity of the process, it is preferred to utilize a molar ratio within the range of 0.8 to 0.9. However, the process of this invention can be carried out with a molar ratio below 0.8 but the productivity falls off in proportion to the deviation below 0.8.

Applicants have found that, for obtaining a high selectivity and consequently a high yield above 95%, for instance 98–99% of unsymmetrical tetrachloroethane in a time suitable for commercial practice, the starting 1,1-dichloroethylene should be free or practically free (below 0.001% by weight) of stabilizers usually incorporated into 1,1-dichloroethylene, such as phenol or p-methoxyphenol, which stabilizers should be eliminated before the chlorination reaction.

Furthermore, it has been established that the chlorination reaction of 1,1-dichloroethylene, in the absence of a catalyst, takes place by way of a radical mechanism as illustrated by the following equation:

$$CCl_2 = CH_2 + Cl_2 \longrightarrow CCl_3 - CH_2Cl.$$

The very small quantity of pentachloroethane, which can form, is obtained by direct substitution of 1,1,1,2-tetrachloroethane. This explains why the formation of trichloroethylene is unobserved. The formation of 1,1,1-trichloroethane is unobserved also since hydrochlorination of 1,1-dichloroethylene cannot occur in the absence of catalyst.

According to the invention, the residence time of reactants in the reaction zone may vary within the range of 3 to 9 hours and preferably below 7 hours and the conversion of 1,1-dichloroethylene is limited to within the range of 80 to 95 molar percent.

The following examples are given by way of illustration, but not by way of limitation, of the practice of this invention.

EXAMPLE 1

One hundred moles/hour of 1,1-dichloroethylene (phenol below 0.0002% by weight) of 99.5% purity and 91 moles/hour of raw chlorine of 97% purity are introduced continuously at a temperature of 50° to 55° C and under atmospheric pressure into a reaction zone in the form of a nickel reactor, and in the absence of light radiations. The molar ratio of $Cl_2/CCl_2 = CH_2$ is 0.88.

The residence time of reactants in the reactor is 5 hours and the transformation rate of 1,1-dichloroethylene at the end of this time is limited to 89 molar percent. A liquid effluent, which is collected continuously from the reactor, is submitted to continuous distillation. The first running fractions, essentially composed of 1,1-dichloroethylene, are recycled to the reactor. The last running fraction is composed essentially of 1,1,1,2-tetrachloroethane. The yield of 1,1,1,2-tetrachloroethane, based upon the converted 1,1-dichloroethylene, is 98.5%. The main impurity is pentachloroethane, representing 0.7 molar percent.

By way of comparison, the chlorination reaction is carried out under the above conditions but with a 1,1-dichloroethylene of 98.5% purity, the impurity being phenol present in the amount of 0.2% by weight. It will be noticed that chlorination does not take place due to the inhibitive action of the stabilizing agent on the chlorination of 1,1-dichloroethylene.

Likewise, by way of comparison, the chlorination reaction is carried out under the same conditions as in Example 1, but with a nickel reactor equipped with a light radiation source. After 5 hours of residence time in the reactor, the conversion rate of the 1,1-dichloroethylene is 92.7 molar per cent. A liquid effluent is collected continuously from the reactor and submitted to continuous distillation. The first running fraction, essentially composed of 1,1-dichloroethylene, is recycled to the reactor. The last running fraction is composed mainly of 1,1,1,2-tetrachloroethane accompanied with heavier chlorinated impurities. The yield of 1,1,1,2-tetrachloroethane based upon the converted 1,1 is only 91.5% and the main impurity is composed of:

a mixture of heavy products (chlorinated $C_4$) representing 6 molar percent expressed in the form of 1,1-dichloroethylene pentachloroethane    2 molar percent
hexachloroethane    0.05 molar percent.

In another comparative test, the chlorination is carried out by introducing at a temperature of 50° to 55° C, under atmospheric pressure, into the nickel reactor of Example 1, and in the absence of light radiations, 100 moles/hour of 1,1-dichloroethylene (phenol below 0.0002% by weight) of 99.5% purity and 110 moles/hour of raw chlorine gas of 97% purity, obtained directly from electrolysis cells, the molar ratio of chlorine/1,1-dichloroethylene being 1.07. The residence time in the reactor is 5 hours and the conversion rate of 1,1-dichloroethylene is 98 % molar per cent. A liquid effluent is collected continuously from the reactor and submitted to continuous distillation. The first running fractions are recycled to the reactor. The last running fraction is composed essentially of:

1,1,1,2-tetrachloroethane which is obtained only in a yield of 91.5% based on the 1,1-dichloroethylene converted pentachloroethane as main impurity representing 8 molar percent of 1,1-dichloroethylene converted.

In a comparative test, the chlorination of 1,1-dichloroethylene is carried out under the same conditions as in Example 1 except that the residence time in the reactor is 2.5 hours and the conversion rate of 1,1-dichloroethylene at the end of this time is limited to 70 molar percent. A liquid effluent is collected continuously from the reactor and submitted to continuous distillation. The first running fractions, essentially composed of 1,1-dichloroethylene, are recycled to the reactor. The last running fraction is composed of 1,1,1,2-tetrachloroethane. The yield of 1,1,1,2-tetrachloroethane, based on the 1,1-dichloroethylene converted, is 98.5 molar per cent. The main impurity is pentachloroethane, representing 0.6 molar percent. However, due to the fact that a non-negligible portion of the chlorine used does not react, but either remains dissolved in the reaction medium or escapes continuously from the reactor through the condenser, the productivity of 1,1,1,2-tetrachloroethane remains far below that of Example 1.

EXAMPLE 2

One hundred moles/hour of 1,1-dichloroethylene (less than 0.0001% by weight phenol) of 99.8% purity, 81 moles/hour of gasified liquid chlorine, and 0.170 g/hour of ferric chloride, corresponding to 0.001% by weight $FeCl_3$ based upon the reaction liquid phase, are introduced continuously at a temperature of 45° to 50° C, under atmospheric pressure, into a glass lined steel reactor in the absence of light radiations.

The residence time of the reactants in the reactor is 3.5 hours and the conversion rate of 1,1-dichloroethylene at the end of this time is limited to 80 molar percent. A liquid effluent is continuously collected from the reactor and submitted to distillation. The first running fractions, essentially composed of 1,1-dichloroethylene, are recycled to the reactor. The last running fraction is essentially composed of 1,1,1,2-tetrachloroethane and the yield, based upon the converted dichloroethylene, is 99%, the main impurity being composed of 0.6 molar percent of pentachloroethane.

In a comparative test, the chlorination of 1,1-dichloroethylene is carried out under the same conditions as in Example 2 except that the ferric chloride is introduced at a rate of 3.4 g/hour instead of 0.170 g/hour, corresponding to 0.02% by weight $FeCl_3$ based on the reaction liquid phase.

The conversion rate of 1,1-dichloroethylene, after a residence time of 3.5 hours of reaction is 83 molar percent. The liquid effluent which flows continuously from the reactor has the following molar composition:

| | |
|---|---|
| 1,1,1,2-tetrachloroethane | 60 |
| trichloroethylene | 16 |
| pentachloroethane | 2 |
| 1,1,1-trichloroethane | 5 |
| 1,1-dichloroethylene | 17 |

The yield of tetrachloroethane is only 72.3 molar percent based upon converted 1,1-dichloroethylene. The gases escaping continuously from the reactor are composed mainly of hydrochloric acid containing traces of chlorine.

EXAMPLE 3

Example 2 is repeated but the ferric chloride is replaced with the same amount of nickel chloride.

The yield of 1,1,1,2-tetrachloroethane based upon the converted 1,1-dichloroethylene is 99 molar percent.

It will be understood that changes may be made in the details of formulation and operation without departing from the spirit of the invention, especially as defined in the following claims.

We claim:

1. A process for the preparation of 1,1,1,2-tetrachloroethane comprising reacting 1,1-dichloroethylene in the liquid phase in the presence of 1,1,1,2-tetrachloroethane with molecular chlorine at a temperature within the range of 20°–90°C in the absence of light and in the absence of a catalyst, wherein the molar ratio of chlorine to 1,1-dichloroethylene is within the range of 0.8 to 0.95 and wherein the 1,1-dichloroethylene contains less than 0.001% by weight of a stabilizer.

2. The process as claimed in claim 1 in which the reaction time is within the range of 3 to 9 hours and the conversion of 1,1-dichloroethylene is limited to within the range of 80 to 95 molar percent.

3. The process as claimed in claim 1 in which the reaction is carried out at a temperature within the range of 50° to 70° C.

* * * * *